(12) United States Patent
Yanagawa et al.

(10) Patent No.: US 10,919,488 B2
(45) Date of Patent: Feb. 16, 2021

(54) WEBBING TAKE-UP DEVICE

(71) Applicant: KABUSHIKI KAISHA TOKAI-RIKA-DENKI-SEISAKUSHO, Aichi (JP)

(72) Inventors: Wataru Yanagawa, Aichi (JP); Shinichi Okubo, Aichi (JP)

(73) Assignee: KABUSHIKI KAISHA TOKAI-RIKA-DENKI-SEISAKUSHO, Aichi (JP)

( * ) Notice: Subject to any disclaimer, the term of this patent is extended or adjusted under 35 U.S.C. 154(b) by 186 days.

(21) Appl. No.: 16/305,615

(22) PCT Filed: Jun. 7, 2017

(86) PCT No.: PCT/JP2017/021183
§ 371 (c)(1),
(2) Date: Nov. 29, 2018

(87) PCT Pub. No.: WO2017/213187
PCT Pub. Date: Dec. 14, 2017

(65) Prior Publication Data
US 2020/0282948 A1     Sep. 10, 2020

(30) Foreign Application Priority Data
Jun. 9, 2016 (JP) ................. 2016-115674

(51) Int. Cl.
*B60R 22/46* (2006.01)
*A44B 11/25* (2006.01)

(52) U.S. Cl.
CPC ...... *B60R 22/4628* (2013.01); *A44B 11/2546* (2013.01); *B60R 22/4676* (2013.01);
(Continued)

(58) Field of Classification Search
CPC . B60R 22/46; B60R 22/4628; B60R 22/4676; B60R 2022/4642
See application file for complete search history.

(56) References Cited

U.S. PATENT DOCUMENTS

| 9,744,940 B1* | 8/2017 | Kohlndorfer | ....... B60R 22/4628 |
| 10,328,895 B2* | 6/2019 | Kohlndorfer | ....... B60R 22/3416 |

(Continued)

FOREIGN PATENT DOCUMENTS

| JP | H11-255072 A | 9/1999 |
| WO | 2016/047338 A1 | 3/2016 |

OTHER PUBLICATIONS

International Search Report and Written Opinion issued in corresponding International Application No. PCT/JP2017/021183 dated Aug. 8, 2017.

*Primary Examiner* — Sang K Kim
(74) *Attorney, Agent, or Firm* — Roberts Calderon Safran & Cole P.C.

(57) ABSTRACT

In a webbing take-up device, when a rotating member is rotated in a take-up direction in a state in which first engagement teeth and second engagement teeth of a rotating member are digging or biting into a moving member, the moving member is pressed by the first engagement teeth and the second engagement teeth of the rotating member. The moving member thus expands into a first deformation-permitting portion and a second deformation-permitting portion in a cover plate, and expanded portions of the moving member oppose a first restriction portion configured by an axial center direction leading end face of a cylinder, and a second restriction portion of the cover plate.

9 Claims, 14 Drawing Sheets

(52) U.S. Cl.
CPC ............... *B60R 2022/4642* (2013.01); *B60R 2022/4685* (2013.01)

(56) References Cited

U.S. PATENT DOCUMENTS

| | | | |
|---|---|---|---|
| 10,369,963 B2 * | 8/2019 | Kohlndorfer | ....... B60R 22/4628 |
| 10,525,932 B2 * | 1/2020 | Yoshioka | ............ B60R 22/4628 |
| 10,549,715 B2 * | 2/2020 | Yoshioka | ............ B60R 22/4633 |
| 2015/0336538 A1 | 11/2015 | Gray et al. | |

* cited by examiner

WEBBING TAKE-UP DEVICE

CROSS-REFERENCE TO RELATED APPLICATIONS

The present application is a U.S. National Phase of PCT/JP2017/021183 filed on Jun. 7, 2017, claiming priority to Japanese Patent Application No. 2016-115674 filed Jun. 9, 2016. The disclosure of the PCT Application is hereby incorporated by reference into the present Application.

TECHNICAL FIELD

The present disclosure relates to a webbing take-up device in which a spool is rotated in a take-up direction by a moving member being moved toward an axial direction leading end side.

RELATED ART

Webbing take-up devices exist in which, when a moving member that is moved toward an axial direction leading end side in a vehicle emergency engages with a rotating member so as to rotate the rotating member, a spool is rotated in a take-up direction and a webbing is taken up onto the spool (see, for example, the specification of US Patent Application Publication No. 2015/0336538).

In such webbing take-up devices, when rotation force in a pull-out direction, this being the opposite direction to the take-up direction, is transmitted from the spool to the rotating member in a state in which the moving member has engaged with the rotating member, the rotating member moves the moving member toward an axial direction base end side.

SUMMARY OF INVENTION

Technical Problem

In consideration of the above circumstances, an object of the present disclosure is to obtain a webbing take-up device capable of effectively suppressing a moving member from moving toward an axial direction base end side due to rotation of a spool in a pull-out direction.

Solution to Problem

A webbing take-up device of a first aspect of the present disclosure includes a spool, a rotating member, a moving member, and a restriction portion. The spool takes up a webbing of a seatbelt device by being rotated in a take-up direction, and is applied with rotation force in a pull-out direction opposite to the take-up direction when the webbing is pulled. When rotated toward one side, the rotating member rotates the spool in the take-up direction, and the rotating member is rotated toward another side by rotation of the spool in the pull-out direction. The moving member is moved toward an axial direction leading end side in a vehicle emergency so as to engage with the rotating member and rotates the rotating member toward the one side, and is capable of deforming in a direction intersecting the axial direction. The restriction portion engages with a deformed portion of the moving member so as to restrict movement of the moving member toward an axial direction base end side.

In the webbing take-up device of the first aspect, if the moving member that has moved toward the axial direction leading end side is pressed by an engagement portion of the rotating member and attempts to return toward the axial direction base end side, the moving member engages with the restriction portion, thereby restricting movement of the moving member toward the axial direction base end side. Accordingly, in a state in which the moving member is engaged with the rotating member, rotation of the rotating member toward the other side can be suppressed, and rotation of the spool in the pull-out direction can be suppressed.

A webbing take-up device of a second aspect of the present disclosure further includes a tube-shaped member. The moving member is disposed inside the tube-shaped member, and one end of the tube-shaped member is open at a side of the rotating member. Under pressure of a fluid supplied to another end side of the moving member, the moving member is moved toward the axial direction leading end side and is moved outward from the one end of the tube-shaped member so as to engage with the rotating member. The rotating member includes an engagement portion that engages with the moving member, the engagement portion has an engagement range with the moving member that increases and decreases due to rotation of the rotating member accompanying movement of the moving member toward the axial direction leading end side. The restriction portion is provided between a rotation position of the engagement portion where the engagement range between the engagement portion of the rotating member and the moving member is at its greatest, and the one end of the tube-shaped member.

In the webbing take-up device of the second aspect, when the moving member that has moved to the axial direction leading end side is pressed by the engagement portion of the rotating member and attempts to return toward the axial direction base end side, the moving member engages with the restriction portion, thereby restricting movement of the moving member toward the axial direction base end side. Accordingly, in a state in which the moving member is engaged with the rotating member, rotation of the rotating member toward the other side can be suppressed, and rotation of the spool in the pull-out direction can be suppressed.

In the webbing take-up device of the second aspect, note that the restriction portion is provided between the rotation position of the engagement portion where the engagement range between the engagement portion of the rotating member and the moving member is at its greatest, and the one end of the tube-shaped member. This enables a deformed portion of the moving member pressed by the rotating member and attempting to return toward the axial direction base end side to engage with the restriction portion effectively.

A webbing take-up device of a third aspect of the present disclosure is the webbing take-up device of the first aspect or the second aspect, further including a guide section. The guide section guides the moving member that has moved in a vehicle emergency, the guide section is provided with a deformation-permitting portion, configured to permit deformation of the moving member, further toward the axial direction leading end side of the moving member than the restriction portion.

In the webbing take-up device of the third aspect, in a vehicle emergency the moving member is moved while being guided by the guide section. The deformation-permitting portion is provided at the guide section further toward the axial direction leading end side of the moving member than the restriction portion. When the moving member is subjected to load from the rotating member and deforms in a direction intersecting the axial direction, the moving member is able to deform in the deformation-permitting portion of the guide section. The deformed portion of the moving member engages with the restriction portion, enabling the moving member to be restricted from moving toward the axial direction base end side.

A webbing take-up device of a fourth aspect of the present disclosure is the webbing take-up device of the third aspect, wherein the restriction portion is provided at the guide section.

In the webbing take-up device of the fourth aspect, the restriction portion is provided at the guide section that guides the moving member. Force received by the restriction portion from the moving member when movement of the moving member toward the axial direction base end side is being restricted by the restriction portion can thus be supported by the guide section.

A webbing take-up device of a fifth aspect of the present disclosure is the webbing take-up device of the second aspect or the third aspect, wherein the restriction portion is provided at a portion of the one end of the tube-shaped member.

In the webbing take-up device of the fifth aspect, the restriction portion is provided at the portion of the one end of the tube-shaped member. Force received by the restriction portion from the moving member when movement of the moving member toward the axial direction base end side is being restricted by the restriction portion can thus be supported by the tube-shaped member.

A webbing take-up device of a sixth aspect of the present disclosure is the webbing take-up device of the fifth aspect, wherein restriction portion is configured as a face of the one end of the tube-shaped member, and the moving member is capable of deforming toward a radial direction outer side of the tube-shaped member at an outer side of the face of the one end of the tube-shaped member.

In the webbing take-up device of the sixth aspect, the moving member is capable of deforming toward the radial direction outer side of the tube-shaped member at an outside of the face of the one end of the tube-shaped member. The moving member that has deformed in this manner is capable of engaging with the face of the one end of the tube-shaped member serving as the restriction portion over a wide range. This thereby enables movement of the moving member toward the axial direction base end side to be restricted effectively by the restriction portion.

Advantageous Effects of Invention

As described above, the webbing take-up device according to the present disclosure is capable of effectively restricting movement of a moving member toward an axial direction base end side due to rotation of a spool in a pull-out direction when the moving member has moved toward an axial direction leading end side in a vehicle emergency.

DESCRIPTION OF EMBODIMENTS

Figure 1:
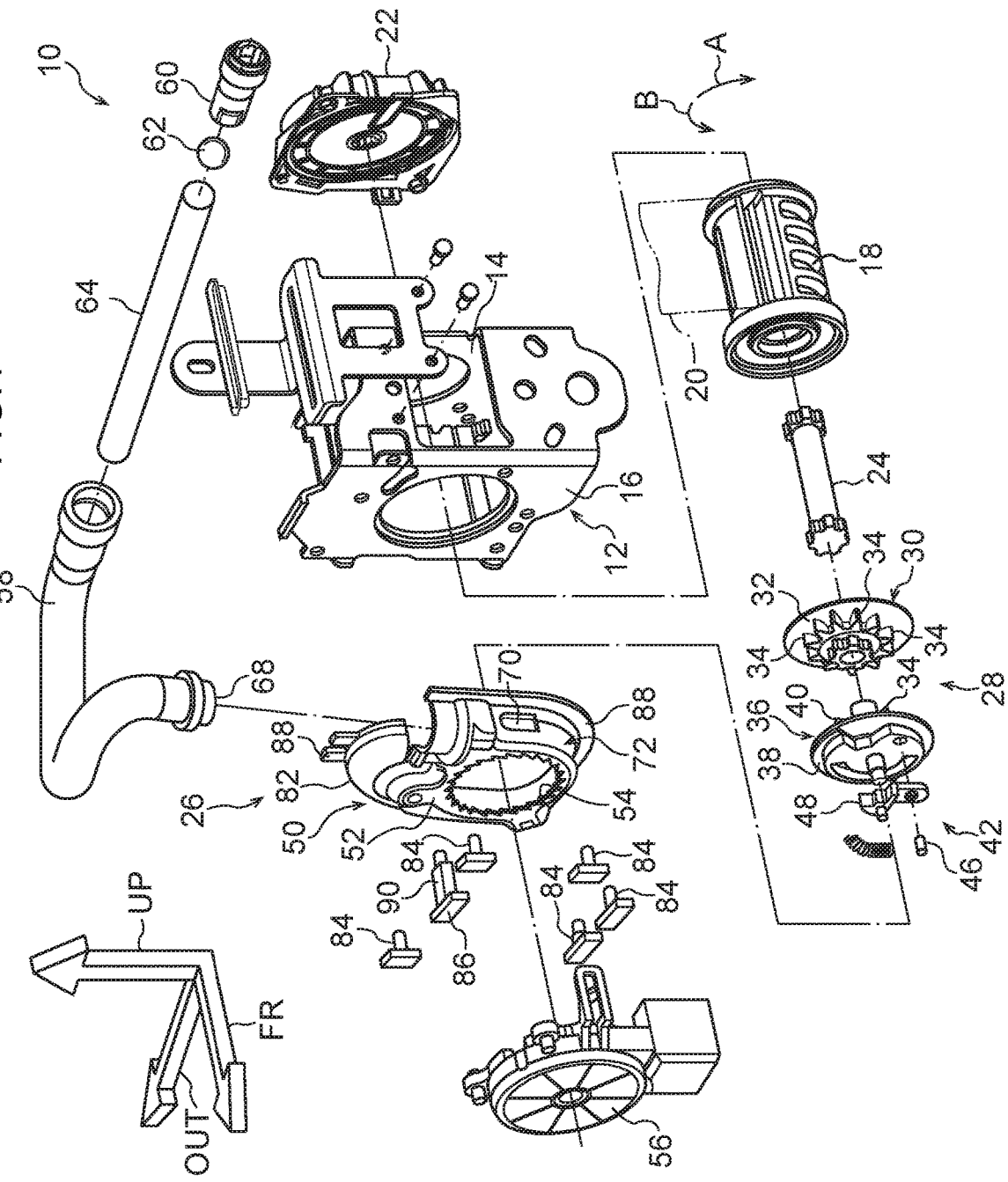
FIG. 1 is an exploded perspective view illustrating a webbing take-up device according to a first exemplary embodiment.

Explanation follows regarding exemplary embodiments of the present invention, with reference to FIG. 1 to FIG. 14. In each of the drawings, the arrow FR indicates the front side, the arrow OUT indicates a vehicle width direction outer side, and the arrow UP indicates a vehicle upper side of a vehicle applied with a webbing take-up device 10. In later embodiments, locations that are basically the same as those already covered in an earlier exemplary embodiment are allocated the same reference numerals, and detailed explanation thereof is omitted.

First Exemplary Embodiment Configuration

As illustrated in FIG. 1, a webbing take-up device 10 according to a first exemplary embodiment includes a frame 12. The frame 12 is fixed to a vehicle lower side portion of a center pillar (not shown in the drawings), serving as a vehicle body. The frame 12 is provided with leg plates 14, 16. The leg plate 14 and the leg plate 16 oppose each other substantially along a vehicle front-rear direction.

The webbing take-up device 10 also includes a spool 18. The spool 18 is formed in a substantially circular tube shape, and is disposed between the leg plate 14 and the leg plate 16 of the frame 12. An axial center direction of the spool 18 runs in the direction in which the leg plate 14 and the leg plate 16 oppose each other (namely, substantially in the vehicle front-rear direction), and the spool 18 is rotatable about its axial center.

A length direction base end portion of an elongated strap-shaped webbing 20 is anchored to the spool 18. When the spool 18 is rotated in a take-up direction (the arrow A direction in FIG. 1, etc.), the webbing 20 is taken up onto the spool 18 from a length direction base end side. A length direction leading end side of the webbing 20 extends from the spool 18 toward the vehicle upper side. The length direction leading end side of the webbing 20 passes through a slit formed in a through anchor (not shown in the drawings) supported by the center pillar at the vehicle upper side of the frame 12, and folds back on itself toward the vehicle lower side.

A length direction leading end portion of the webbing 20 is anchored to an anchor plate (not shown in the drawings). The anchor plate is formed from a metal plate material such as steel, and is fixed to the vehicle floor (not shown in the drawings) or fixed to a frame member (not shown in the drawings) of a seat corresponding to the webbing take-up device 10.

A vehicle seatbelt device applied with the webbing take-up device 10 includes a buckle device (not shown in the drawings). The buckle device is provided at the vehicle width direction inner side of the seat applied with the webbing take-up device 10. A tongue (not shown in the drawings) provided to the webbing 20 is engaged with the buckle device in a state in which the webbing 20 has been wrapped across the body of an occupant sitting in the seat, such that the webbing 20 is worn over the body of the occupant.

A shaft portion (not illustrated in the drawings) is integrally and coaxially provided at the spool 18 at the vehicle rear side of the spool 18. The shaft portion passes through a hole (not illustrated in the drawings) formed in the leg plate 14 of the frame 12 and extends toward the vehicle rear side of the frame 12.

As illustrated in FIG. 1, a spring housing 22 is provided at the vehicle rear side of the leg plate 14 of the frame 12. A spool urging member such as a spiral spring (not shown in the drawings) is provided inside the spring housing 22. The spool urging member engages with the spool 18 directly or indirectly through the shaft portion, and the spool 18 is urged in the take-up direction (the arrow A direction in FIG. 1) by urging force of the spool urging member.

The webbing take-up device 10 includes a torsion bar 24 configuring a force limiter mechanism. The torsion bar 24 is formed in an elongated rod shape running substantially in the vehicle front-rear direction. A vehicle rear side portion of the torsion bar 24 is disposed inside the spool 18, and is linked to the spool 18 in a state in which rotation of the torsion bar 24 relative to the spool 18 is restricted. A vehicle front side portion of the torsion bar 24 passes through a hole formed in the leg plate 16 of the frame 12 and extends toward the outside (vehicle front side) of the frame 12.

A rotating member 28 of a pre-tensioner 26 is provided at the vehicle front side of the leg plate 16 of the frame 12. The rotating member 28 includes a first rotation section 30. The first rotation section 30 is disposed coaxially to the spool 18, and the vehicle front side portion of the torsion bar 24 is coupled to the first rotation section 30. The rotating member 28 is thereby restricted from rotating relative to the vehicle front side portion of the torsion bar 24, such that rotation of the rotating member 28 relative to the spool 18 is indirectly restricted through the torsion bar 24.

The first rotation section 30 of the rotating member 28 includes a first flange 32. The first flange 32 is formed in a disc shape, and plural first engagement teeth 34, serving as an engagement portion, are disposed at the vehicle front side of the first flange 32. The first engagement teeth 34 are formed at predetermined spacings about the axial center of the first flange 32, and vehicle rear side ends of the first engagement teeth 34 are integrally linked to the first flange 32. Rotation-circumferential direction dimensions of each of the first engagement teeth 34 shorten on progression toward the radial direction outer side of the rotating member 28.

Moreover, a second rotation section 36, which configures the rotating member 28 together with the first rotation section 30, is provided at a vehicle front side of the first rotation section 30. The second rotation section 36 includes a second flange 38. The second flange 38 is configured in a disc shape, and plural second engagement teeth 40, serving as an engagement portion, are disposed at the vehicle rear side of the second flange 38. The second engagement teeth 40 are formed at predetermined spacings about the axial center of the second flange 38. The spacings between adjacent second engagement teeth 40 about the axial center of the second rotation section 36 are the same as the spacings between adjacent first engagement teeth 34 described above about the axial center of the first rotation section 30.

As viewed along an axial center direction of the rotating member 28, each of the second engagement teeth 40 are disposed substantially centrally between adjacent first engagement teeth 34 about the axial center of the first rotation section 30. The second rotation section 36 is coupled to the first rotation section 30 in this state, such that the second rotation section 36 is restricted from moving, including being restricted from rotating, relative to the first rotation section 30.

A portion of the second rotation section 36 on the vehicle front side of the second flange 38 configures a lock base 44 of a lock mechanism 42. The lock base 44 includes a pawl pin 46. The axial direction of the pawl pin 46 runs along the vehicle front-rear direction, and a vehicle rear side end portion of the pawl pin 46 is supported by the lock base 44 (namely, by the rotating member 28). A lock pawl 48 is also provided at the lock base 44. A base end portion of the lock pawl 48 is supported by the pawl pin 46 so as to be capable of swinging about the pawl pin 46.

A cover plate 50, serving as a guide section and configuring both the locking mechanism 42 and the pre-tensioner 26, is fixed to the vehicle front side of the leg plate 16, corresponding to the lock base 44 and the lock pawl 48. The cover plate 50 is open toward the vehicle rear side, and a bottom plate 52 of the cover plate 50 opposes the leg plate 16 in a state spaced apart toward the vehicle front side of the leg plate 16.

A ratchet hole 54 is formed at the bottom plate 52 of the cover plate 50. Ratchet teeth are formed at an inner peripheral portion of the ratchet hole 54. The lock pawl 48 of the lock base 44 opposes the inner peripheral portion of the ratchet hole 54 in a swing-radial direction of the lock pawl 48. When the lock pawl 48 is swung in one direction about the pawl pin 46, a leading end portion of the lock pawl 48 approaches the inner peripheral portion of the ratchet hole 54, and the leading end portion of the lock pawl 48 meshes with one of the ratchet teeth of the ratchet hole 54. The lock base 44 is thus restricted from rotating in the pull-out direction, indirectly restricting the spool 18 from rotating in the pull-out direction.

A sensor holder 56 of the locking mechanism 42 is provided at the vehicle front side of the cover plate 50. The sensor holder 56 is open toward the vehicle rear side, and is either directly fixed to the leg plate 16 of the frame 12, or indirectly fixed thereto through the cover plate 50. Various components configuring a sensor mechanism that detects a vehicle emergency state are housed inside the sensor holder 56. When the sensor mechanism inside the sensor holder 56 is actuated in a vehicle emergency, the lock pawl 48 is swung in the one direction about the pawl pin 46 coordinated with pull-out direction rotation of the lock base 44 of the locking mechanism 42.

The webbing take-up device 10 further includes a cylinder 58, serving as a tube-shaped member that configures the pre-tensioner 26. The cylinder 58 is formed in a circular tube shape. An axial center direction base end portion of the cylinder 58 is disposed at the vehicle upper rear side of the frame 12. A micro gas generator 60, configuring a load generator that serves as a fluid pressure generator, is inserted into the axial center direction base end portion of the cylinder 58. The micro gas generator 60 is electrically connected to a collision detection sensor via an ECU (neither of which are shown in the drawings) that serves as a controller provided at the vehicle. The micro gas generator 60 is actuated by the ECU when an impact has been detected by the collision detection sensor in a vehicle collision, and gas, a form of fluid generated by the micro gas generator 60, is supplied into the cylinder 58.

A ball seal 62, serving as a piston, is disposed inside the cylinder 58. The ball seal 62 is formed from a synthetic resin. The ball seal 62 has a substantially spherical shape in a state in which the ball seal 62 is not being imparted with load. The ball seal 62 partitions an internal space of the cylinder 58 into an axial center direction base end side of the ball seal 62 and an axial center direction leading end side of the ball seal 62. When the micro gas generator 60 is actuated, the gas generated by the micro gas generator 60 is supplied to the cylinder 58. The internal pressure in the cylinder 58 accordingly rises between the micro gas generator 60 and the ball seal 62, and the ball seal 62 moves toward the axial center direction leading end side of the cylinder 58, and is compressed and deformed in the axial center direction of the cylinder 58.

A moving member 64 is also disposed inside the cylinder 58. The moving member 64 is formed in a circular column shape from a synthetic resin, and is capable of deforming when subjected to external force. The moving member 64 is disposed at the axial center direction leading end side of the cylinder 58 with respect to the ball seal 62. When the ball seal 62 moves toward the axial center direction leading end side of the cylinder 58, the moving member 64 is pressed by the ball seal 62 and is moved toward the axial center direction leading end side of the cylinder 58.

The cylinder 58 is bent at an axial center direction intermediate portion, and an axial center direction leading end portion of the cylinder 58 is disposed at the vehicle upper front side of the leg plate 16 of the frame 12. The cylinder 58 is retained clamped between the cover plate 50 and the leg plate 16 of the frame 12. The axial center direction leading end of the cylinder 58 is open substantially toward the vehicle lower side and in a direction angled toward the vehicle width direction outer side with respect to the vehicle lower side. When the moving member 64 reaches the axial center direction leading end portion of the cylinder 58, the moving member 64 is pressed by the ball seal 62 and moves further, so as to project out from the axial center direction leading end portion of the cylinder 58 toward the vehicle lower side.

An axial center direction leading end face of the cylinder 58 configures a planar face that is orthogonal to the axial center direction of the cylinder 58. The axial center direction leading end face of the cylinder 58 and an inner circumferential face of the cylinder 58 at the axial center direction leading end portion of the cylinder 58 are orthogonal to each other, and the axial center direction leading end face of the cylinder 58 and an outer circumferential face of the cylinder 58 are also orthogonal to each other.

Figure 3:
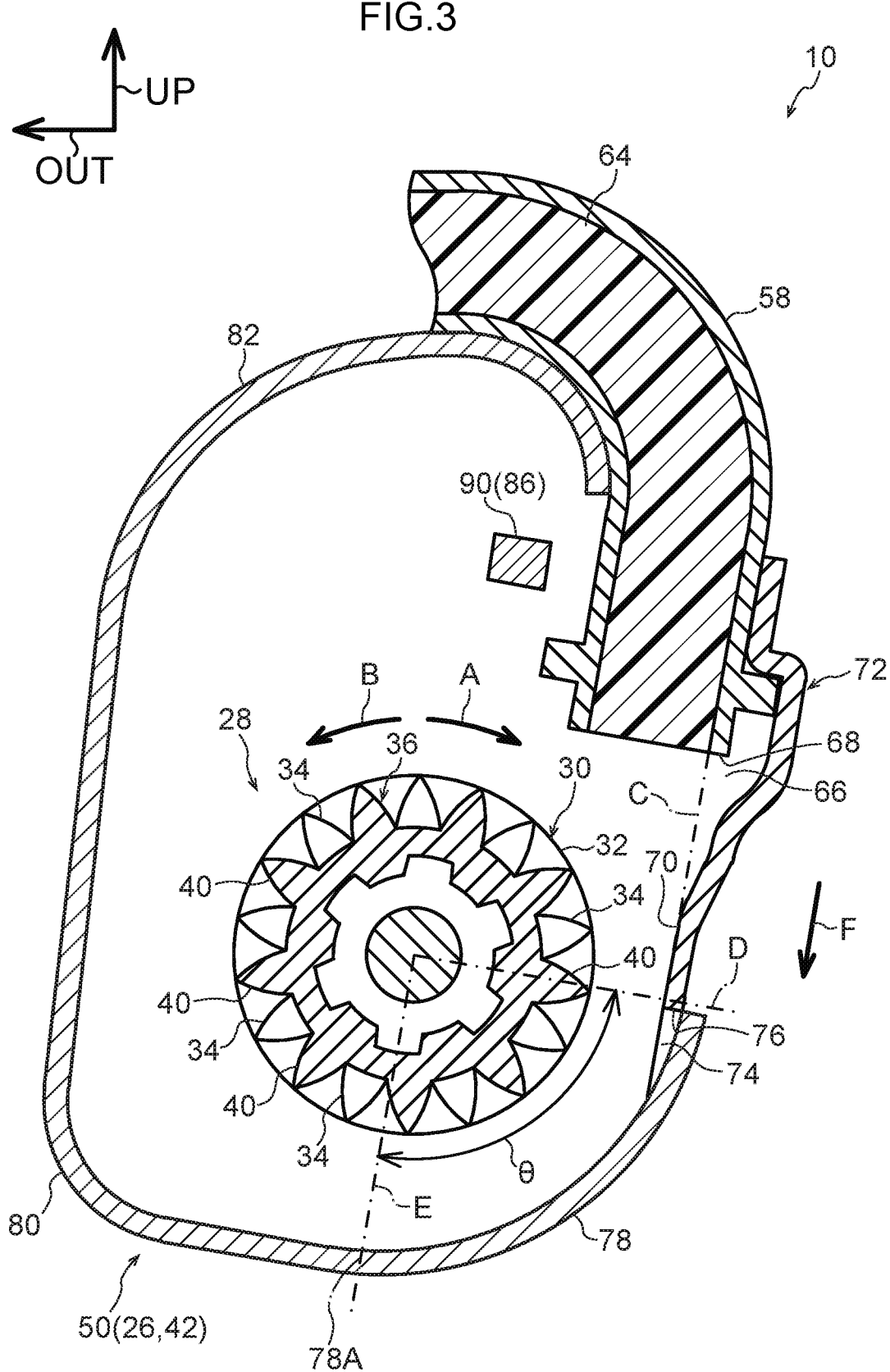
FIG. 3 is a cross-section illustrating a cover plate, a cylinder, a moving member, and a rotating member, as viewed from a vehicle front side.

A first deformation-permitting portion 66 is provided at portion inside the cover plate 50 and positioned substantially at a vehicle lower side of the axial center direction leading end of the cylinder 58, in a direction angled toward the vehicle width direction outer side with respect to the vehicle lower side. As illustrated in FIG. 3, a space in the first deformation-permitting portion 66 that is substantially at the vehicle lower side of the axial center direction leading end of the cylinder 58 widens further toward an outer side in an orthogonal direction to the axial center from an outer circumferential edge at the leading end of the cylinder 58. The moving member 64 that has projected out toward the vehicle lower side from the axial center direction leading end of the cylinder 58 is thereby able to deform so as to expand toward the orthogonal direction outer side with respect to the axial center of the moving member 64.

Note that in the present exemplary embodiment, the axial center direction leading end of the cylinder 58 configures a first restriction portion 68, serving as a restriction portion. When the moving member 64, that has projected out toward the vehicle lower side from the leading end of the cylinder 58, expands toward the orthogonal direction outer side with respect to the axial center of the moving member 64 at the first deformation-permitting portion 66, an expanded portion of the moving member 64 opposes the first restriction portion 68 of the cylinder 58 in the axial center direction. Thus, if the moving member 64, that has projected out toward the vehicle lower side from the leading end of the cylinder 58 attempts to return into the cylinder 58, the portion of the moving member 64 that has expanded toward the orthogonal direction outer side to the axial center abuts the first restriction portion 68 (the axial center direction leading end of the cylinder 58).

Furthermore, the rotating member 28 previously described is disposed substantially at the vehicle lower side of the first deformation-permitting portion 66 inside the cover plate 50. When the moving member 64 pressed by the ball seal 62 moves to substantially the vehicle lower side of the first deformation-permitting portion 66, the moving member 64 enters between the first flange 32 of the first rotation section 30 and the second flange 38 of the second rotation section 36 of the rotating member 28. The moving member 64 abuts the first engagement teeth 34 of the first rotation section 30 and the second engagement teeth 40 of the second rotation section 36, and the first engagement teeth 34 and the second engagement teeth 40 are pressed toward the vehicle lower side by the moving member 64.

As a result, the rotating member 28 is rotated in the take-up direction (the arrow A direction in FIG. 3, etc.), and the moving member 64 is moved further toward the vehicle lower side under the pressure from the ball seal 62. In this manner, the rotating member 28 is rotated in the take-up direction by the moving member 64, and the first engagement teeth 34 and the second engagement teeth 40 dig into the moving member 64. The rotating member 28 is rotated further in the take-up direction as the moving member 64 is moved further toward the vehicle lower side in this state.

Figure 2:
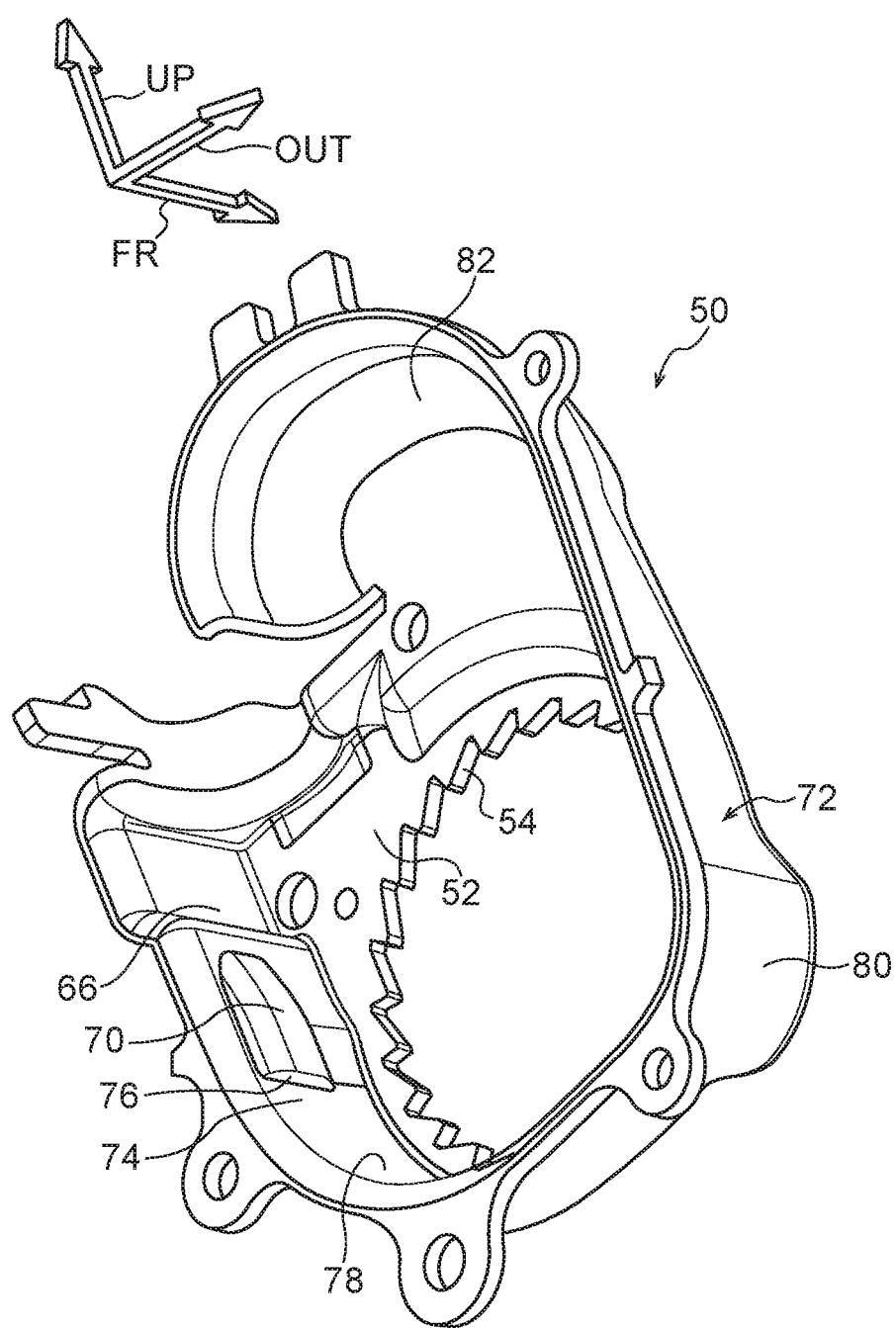
FIG. 2 is a perspective view illustrating the inside of a cover plate.

A direction-guiding portion 70 is provided at the vehicle lower side of the first deformation-permitting portion 66 in the cover plate 50. The direction-guiding portion 70 is configured by part of a vehicle width direction inner side portion of a side wall 72, serving as a wall section of the cover plate 50. As illustrated in FIG. 2 and FIG. 3, the side wall 72 at the direction-guiding portion 70 is profiled toward the vehicle width direction outer side at the inner side of the cover plate 50. As illustrated in FIG. 3, an inner side face at a vehicle lower side portion of the direction-guiding portion 70 is disposed running along a single-dotted dashed line C, that is extended downward from a vehicle width direction inner side of the inner circumferential face at the leading end portion of the cylinder 58. Moreover, a vehicle lower side end portion of the direction-guiding portion 70 is disposed on a single-dotted dashed line D, that is extended toward the vehicle width direction inner side from the rotation center of the rotating member 28 so as to orthogonally intersect with the axial center direction at the leading end portion of the cylinder 58.

A second deformation-permitting portion 74 is provided at the vehicle lower side of the direction-guiding portion 70. At the second deformation-permitting portion 74, the inner side face of the side wall 72 is disposed further toward the vehicle width direction inner side than an inner side face of the direction-guiding portion 70. The moving member 64 is thereby able to expand toward the vehicle width direction inner side at the second deformation-permitting portion 74.

A second restriction portion 76 is provided at a vehicle lower side face of the direction-guiding portion 70. The second restriction portion 76 is a planar face orthogonal to the axial center direction of the leading end portion of the cylinder 58. When the moving member 64 expands toward the vehicle width direction inner side at the second deformation-permitting portion 74, the expanded portion of the moving member 64 opposes the second restriction portion 76 in the axial center direction of the cylinder 58. Thus, the expanded portion abuts the second restriction portion 76 if the moving member 64 attempts to move toward the axial direction base end side.

A bend portion 78 is disposed at a portion of the side wall 72 of the cover plate 50 at the vehicle lower side of the second deformation-permitting portion 74. The bend portion 78 curves about a center of curvature at the rotation center side of the rotating member 28. A distance between the bend portion 78 and the rotation center of the rotating member 28 increases on progression toward the take-up direction side. A distance between a take-up direction side end 78A of the bend portion 78 and the rotation center of the rotating member 28 is equal to or greater than the sum of a radial dimension of a circle described by leading ends of the first engagement teeth 34 and the second engagement teeth 40 of the rotating member 28, and a diameter dimension of the moving member 64. The moving member 64 bends so as to follow the bend portion 78, such that the moving member 64 is able to separate from the first engagement teeth 34 and the second engagement teeth 40 at the take-up direction side end 78A of the bend portion 78.

Note that an angle θ formed between the single-dotted dashed line D, that is orthogonal to the axial center direction of the cylinder 58 and that extends from the rotation center of the rotating member 28 toward the vehicle width direction inner side, and a single-dotted dashed line E, that passes through the rotation center of the rotating member 28 and the take-up direction side end 78A of the bend portion 78, is set to less than 180°. Specifically, the angle θ is set to 90° in the present exemplary embodiment.

A first corner portion 80, serving as a corner portion, is formed at a portion of the side wall 72 at the vehicle width direction outer side of the bend portion 78. On the opposite side to the bend portion 78 of the first corner portion 80, the side wall 72 extends from the first corner portion 80 to the vehicle upper side while being angled toward the vehicle width direction inner side. The portion of the side wall 72 that extends toward the vehicle upper side from the first corner portion 80 is inclined with respect to the single-dotted dashed line E so as to move away from the single-dotted dashed line E. The first corner portion 80 of the side wall 72 is bent about a center of curvature at the inner side of the cover plate 50, and the radius of curvature of the first corner portion 80 is smaller than the radius of curvature of the bend portion 78 of the side wall 72.

A second corner portion 82, serving as a corner portion, is formed at a portion of the side wall 72 of the cover plate 50 at the vehicle upper side of the first corner portion 80. On the opposite side to the first corner portion 80 of the second corner portion 82, the side wall 72 extends toward the vehicle width direction inner side from the second corner portion 82. The second corner portion 82 bends about a center of curvature at the inside of the cover plate 50, and the radius of curvature of the second corner portion 82 is not greater than the radius of curvature of the bend portion 78. The portion extending toward the vehicle width direction inner side from the second corner portion 82 bends alongside the cylinder 58 so as to follow the cylinder 58.

The cover plate 50 configured in this manner is fixed to the leg plate 16 of the frame 12 using plural first rivets 84 and a single second rivet 86, as illustrated in FIG. 1. A flange 88 extends toward the outer side of the cover plate 50 from the side wall 72. Leading end portions (vehicle rear side end portions) of the first rivets 84 are crimped in a state in which the first rivets 84 penetrate the flange 88 and the leg plate 16 of the frame 12 from a cover plate 50 side.

The second rivet 86 is provided at the vehicle upper side of the rotating member 28, and at the vehicle width direction outer side of the axial center direction leading end portion of the cylinder 58. A leading end portion (vehicle rear side end portion) of the second rivet 86 is crimped in a state in which the second rivet 86 penetrates the bottom plate 52 and the leg plate 16 of the frame 12 from the cover plate 50 side. An intermediate portion of the second rivet 86 configures a movement restriction portion 90. The moving member 64 is restricted from moving toward its axial direction leading end side when the axial direction leading end of the moving member 64 abuts the movement restriction portion 90 of the second rivet 86. In the present exemplary embodiment, the axial direction length of the moving member 64 is set such that an axial direction base end of the moving member 64 inside the cylinder 58 does not come out from the leading end of the cylinder 58 in a state in which the axial direction leading end of the moving member 64 has abutted the movement restriction portion 90 of the second rivet 86.

Operation and Advantageous Effects of First Exemplary Embodiment

Explanation follows regarding operation and advantageous effects of the present exemplary embodiment.

In the webbing take-up device 10, the sensor mechanism of the locking mechanism 42 is actuated in a vehicle collision, this being one example of vehicle emergency. When the sensor mechanism of the locking mechanism 42 is in an actuated state, the lock pawl 48 of the lock base 44 is swung in the one direction about the pawl pin 46 in coordination with rotation of the lock base 44 of the locking mechanism 42 in the pull-out direction (the arrow B direction in FIG. 1, etc.). The leading end portion of the lock pawl 48 accordingly approaches the inner peripheral portion of the ratchet hole 54 at the bottom plate 52 of the cover plate 50, and the leading end portion of the lock pawl 48 meshes with the ratchet teeth of the ratchet hole 54, thereby restricting the lock base 44 from rotating in the pull-out direction.

The lock base 44 is formed at the second rotation section 36 of the rotating member 28. The first rotation section 30 of the rotating member 28 is restricted from rotating relative to the second rotation section 36 and is linked to the vehicle front side of the torsion bar 24. Since the first rotation section 30 and the spool 18 are both restricted from rotating relative to the torsion bar 24, the spool 18 is restricted from rotating in the pull-out direction (the arrow B direction in FIG. 1, etc.) due to the rotating member 28 being restricted from rotating in the pull-out direction. The webbing 20 is thereby restricted from being pulled out from the spool 18, enabling the body of the occupant to be restrained by the webbing 20.

If the occupant attempts to move toward the vehicle front side under inertia in a state in which the lock base 44 is restricted from rotating in the pull-out direction (the arrow B direction in FIG. 1, etc.), tensile force acts on the webbing 20 from the body of the occupant, and rotation force in the pull-out direction acts on the vehicle rear side portion of the torsion bar 24 through the spool 18 according to this tensile force. If the pull-out direction rotation force acting on the vehicle rear side portion of the torsion bar 24 exceeds the mechanical strength of the torsion bar 24, the vehicle rear side portion of the torsion bar 24 undergoes torsional deformation so as to rotate in the pull-out direction with respect to the vehicle front side portion of the torsion bar 24.

The spool 18 is rotated in the pull-out direction (the arrow B direction in FIG. 1, etc.) proportionately to this torsional deformation of the torsion bar 24, and the webbing 20 is pulled from the spool 18 by a length proportionate to the rotation amount of the spool 18 in the pull-out direction. The occupant is thereby able to move toward the vehicle front side under inertia proportionately to the length of webbing 20 pulled out from the spool 18, and part of the tensile force acting on the webbing 20 from the occupant is expended and absorbed by the torsional deformation of the torsion bar 24.

In the webbing take-up device 10, in a vehicle collision, this being the one example of vehicle emergency, high pressure gas is supplied inside the cylinder 58 instantly, as the micro gas generator 60 of the pre-tensioner 26 is actuated by the ECU. When the ball seal 62 is moved toward the axial center direction leading end side of the cylinder 58 by the pressure of the gas, the moving member 64 is pressed by the ball seal 62, and the moving member 64 is moved toward the axial center direction leading end side of the cylinder 58.

Figure 4:
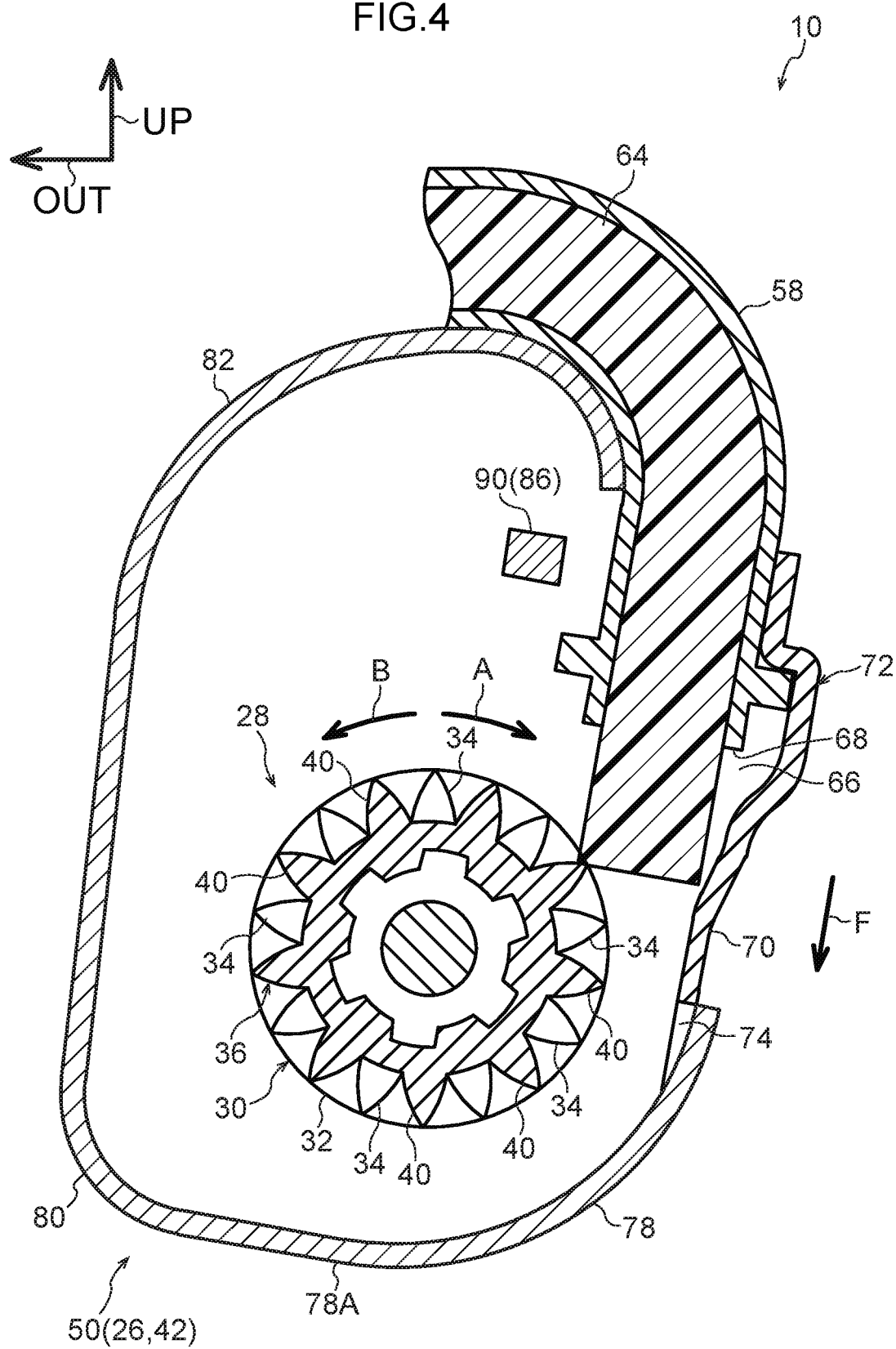
FIG. 4 is a cross-section corresponding to FIG. 3, illustrating a state in which an axial direction leading end of a moving member has abutted a second engagement tooth of a rotating member.

Due to the moving member 64 being moved toward the axial direction leading end side, an axial direction leading end portion of the moving member 64 moves out of the axial center direction leading end of the cylinder 58 toward the vehicle lower side (the arrow F direction in FIG. 3, etc.). A vehicle width direction inner side portion at the axial direction leading end portion of the moving member 64 abuts the inner side face of the cover plate 50 at the direction-guiding portion 70. When the moving member 64 moves further toward the axial direction leading end side in this state, as illustrated in FIG. 4, the moving member 64 enters between the first flange 32 and the second flange 38 of the rotating member 28. The first engagement teeth 34 and the second engagement teeth 40 of the rotating member 28 are pressed toward the vehicle lower side (the arrow F direction in FIG. 4, etc.) by the axial direction leading end of the moving member 64, such that the rotating member 28 is rotated in the take-up direction (the arrow A direction in FIG. 4, etc.).

Figure 5:
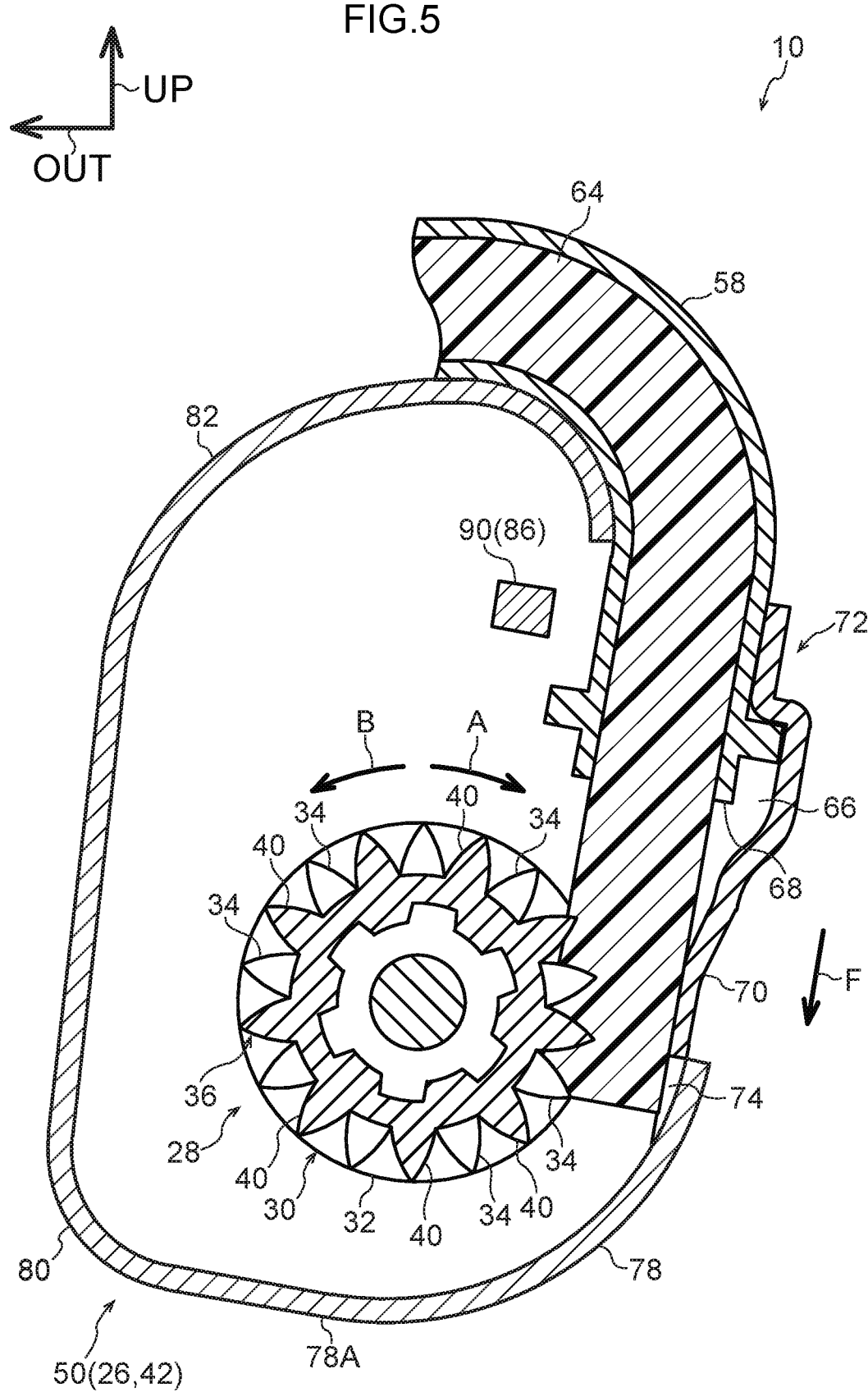
FIG. 5 is a cross-section corresponding to FIG. 4, illustrating a state in which first engagement teeth and second engagement teeth of a rotating member are digging into a moving member.
Figure 6:
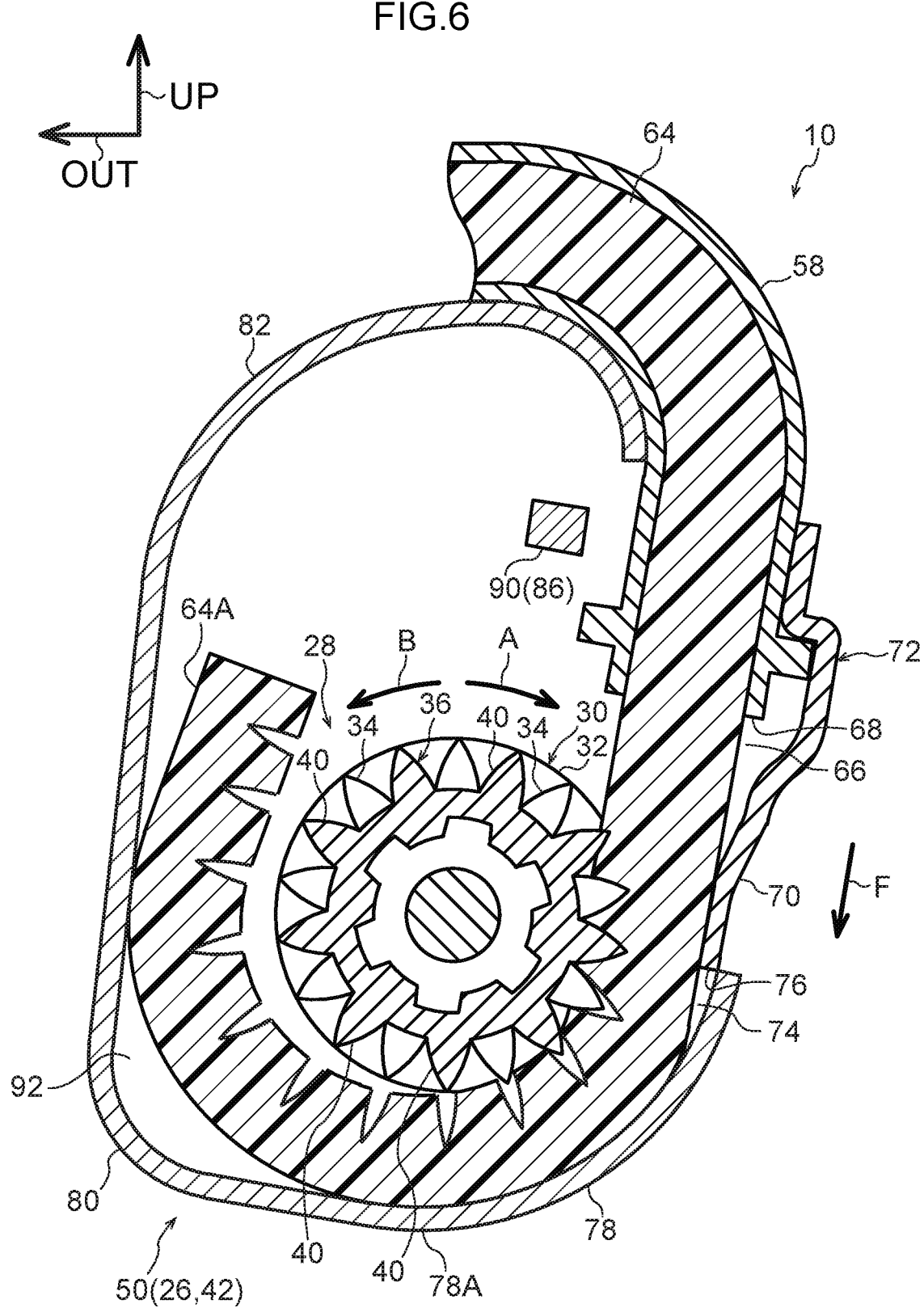
FIG. 6 is a cross-section corresponding to FIG. 5, illustrating a state in which an axial direction leading end of a moving member has abutted a movement restriction portion of a second rivet.
Figure 7:
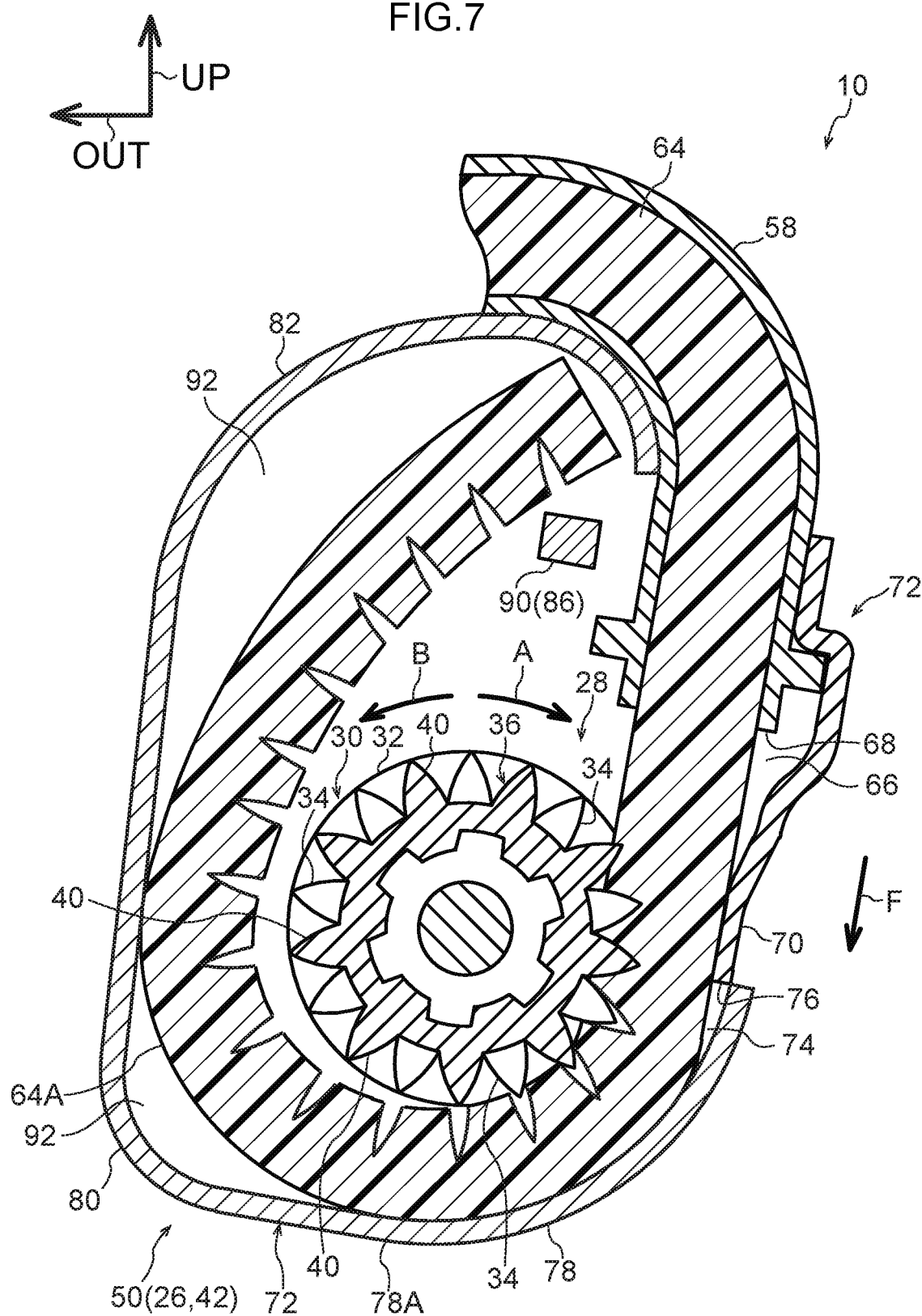
FIG. 7 is a cross-section corresponding to FIG. 6, illustrating a state in which a moving member has expanded at a first deformation-permitting portion and a second deformation-permitting portion.

Moreover, due to the rotating member 28 rotating in the take-up direction as illustrated in FIG. 5, first engagement teeth 34 and second engagement teeth 40 that are located at further toward the pull-out direction side (the arrow B direction side in FIG. 4, etc.) than the first engagement teeth 34 and the second engagement teeth 40 pressed by the leading end of the moving member 64 bite or dig into the moving member 64 from an outer circumferential face of the moving member 64 toward a radial direction central side of the moving member 64.

The rotating member 28 is rotated further toward the take-up direction (the arrow A direction in FIG. 5, etc.) due to the moving member 64, into which the first engagement teeth 34 and the second engagement teeth 40 are biting or digging, being moved further toward the vehicle lower side (the arrow F direction in FIG. 5, etc.). This take-up direction rotation of the rotating member 28 is transmitted to the spool 18 through the torsion bar 24, such that the spool 18 is rotated in the take-up direction. The webbing 20 is thus taken up onto the spool 18, increasing the restraining force on the occupant from the webbing 20.

The first engagement teeth 34 and the second engagement teeth 40 bite or dig into the moving member 64 at a position further toward the vehicle upper side than the position of the single-dotted dashed line D in FIG. 3. When the rotating member 28 is rotated in the take-up direction (the arrow A direction in FIG. 3, etc.) from this state due to the moving member 64 moving toward the axial direction leading end side, the amount by which the first engagement teeth 34 and the second engagement teeth 40 bite or dig into the moving member 64 (namely, the range over which the first engagement teeth 34 and the second engagement teeth 40 engage with the moving member 64) increases.

The amount by which the first engagement teeth 34 and the second engagement teeth 40 bite or dig into the moving member 64, namely, the range over which the first engagement teeth 34 and the second engagement teeth 40 engage with the moving member 64, is at its greatest when the leading ends of the first engagement teeth 34 and the leading ends of the second engagement teeth 40 disposed at the single-dotted dashed line D in FIG. 3.

The vehicle lower side end of the direction-guiding portion 70 of the cover plate 50 is disposed at further vehicle lower side than the single-dotted dashed line D in FIG. 3. The length from the rotation center of the rotating member 28 to the inner side face of the cover plate 50 at the portion of the direction-guiding portion 70 at the vehicle lower side from the single-dotted dashed line D in FIG. 3 is longer than the length from the rotation center of the rotating member 28 to the inner side face of the cover plate 50 at the direction-guiding portion 70 at the single-dotted dashed line D in FIG. 3.

Thus, in a state in which the moving member 64 has abutted the inner side face of the cover plate 50 at the direction-guiding portion 70 of the cover plate 50, when the moving member 64 moves further toward the axial direction leading end side such that the moving member 64 passes the position of the single-dotted dashed line D in FIG. 3, the moving member 64 moves away from the rotation center of the rotating member 28. The amount by which the first engagement teeth 34 and the second engagement teeth 40 bite or dig into the moving member 64 (namely, the range over which the first engagement teeth 34 and the second engagement teeth 40 of the rotating member 28 engage with the moving member 64) thereby decreases (see FIG. 6).

If the moving member 64 moves further toward the axial direction leading end side from this state, the moving member 64 undergoes bending deformation about a center of curvature on the rotating member 28 side. Due to the moving member 64 moving toward the axial direction leading end side in this manner, the axial direction leading end of the moving member 64 abuts the movement restriction portion 90 at the intermediate portion of the second rivet 86, thereby restricting the moving member 64 from moving toward the axial direction leading end side.

In this state, in a case in which the body of the occupant moves toward the vehicle front side under inertia, and the rotating member 28 is thereby rotated in the pull-out direction (the arrow B direction in FIG. 6, etc.), the portion of the moving member 64 into which the first engagement teeth 34 and the second engagement teeth 40 are biting or digging is subjected to rotation force in the pull-out direction (the arrow B direction in FIG. 6, etc.) from the first engagement teeth 34 and the second engagement teeth 40. A portion of the moving member 64 located at further toward the axial direction base end side than the portion of the moving member 64, at which the first engagement teeth 34 and the second engagement teeth 40 are biting or digging into, is thereby compressed in the axial direction. When compressed in this manner, the moving member 64 attempts to expand in its orthogonal direction with respect to the axial direction of the moving member 64.

Note that the inner side face of the side wall 72 at the second deformation-permitting portion 74 is disposed at further toward the vehicle width direction inner side than the inner side face of the side wall 72 at the direction-guiding portion 70. Thus, the moving member 64 that has been compressed in the above manner is able to deform in the orthogonal direction with respect to the axial direction of the moving member 64 so as to occupy the space at the second deformation-permitting portion 74. The portion of the moving member 64 that has expanded inside the second deformation-permitting portion 74 in this manner opposes the second restriction portion 76 in the axial center direction of the leading end portion of the cylinder 58. Thus, when the moving member 64 attempts to move toward the axial direction base end side, the expanded portion of the moving member 64 inside the second deformation-permitting portion 74 abuts the second restriction portion 76, and the moving member 64 is restricted from moving toward the axial direction base end side.

Moreover, the first deformation-permitting portion 66 is configured at the inner side of the cover plate 50 at the vehicle lower side of the axial center direction leading end of the cylinder 58. Thus, the moving member 64 compressed in the above manner is able to expand in its orthogonal direction with respect to the axial direction at the vehicle lower side of the axial center direction leading end of the cylinder 58. The portion of the moving member 64 that has expanded inside the first deformation-permitting portion 66 in this manner opposes the first restriction portion 68, this being the axial center direction leading end of the cylinder 58 of the cylinder 58. Thus, when the moving member 64 attempts to move toward the axial direction base end side, the expanded portion of the moving member 64 inside the first deformation-permitting portion 66 abuts the first restriction portion 68, and the moving member 64 is restricted from moving toward the axial direction base end side.

Since the moving member 64 is restricted from moving toward the axial direction base end side as described above, the rotating member 28 can be restricted from rotating in the pull-out direction (the arrow B direction in FIG. 6, etc.), enabling a state similar to the state in which the leading end portion of the lock pawl 48 of the locking mechanism 42 meshes with the ratchet teeth in the ratchet hole 54 at the bottom plate 52 of the cover plate 50 to be achieved, thereby restricting the lock base 44 from rotating in the pull-out direction. Actuating the pre-tensioner 26 thereby enables the spool 18 to be restricted from rotating in the pull-out direction. This enables the webbing 20 to be restricted from being pulled out from the spool 18, enabling the body of the occupant to be effectively restrained by the webbing 20.

Moreover, since the rotating member 28 can be restricted from rotating in the pull-out direction as described above, when rotation force in the pull-out direction (the arrow B direction in FIG. 1, etc.) acts on the vehicle rear side portion of the torsion bar 24 through the spool 18 as a result of tensile force acting on the webbing 20 from the body of the occupant exceeds the mechanical strength of the torsion bar 24, the torsion bar 24 can be made to undergo torsional deformation.

Furthermore, similar advantageous effects to the above-described advantageous effects can be obtained even in cases in which the webbing 20 is pulled by the body of the occupant with a tensile force exceeding the rotation force of the rotating member 28 when the pre-tensioner 26 has been actuated.

Moreover, the first restriction portion 68 is provided at the axial center direction leading end of the cylinder 58. Namely, the first restriction portion 68 is disposed further toward the axial direction base end side of the moving member 64 than the position of the single-dotted dashed line D in FIG. 3 where the amount by which the first engagement teeth 34 and the second engagement teeth 40 bite or dig into the moving member 64, namely, the range over which the first engagement teeth 34 and the second engagement teeth 40 engage with the moving member 64, is at its greatest. In the state in which the amount by which the first engagement teeth 34 and the second engagement teeth 40 bite or dig into the moving member 64 is at its greatest, the rotation force in the pull-out direction (the arrow B direction in FIG. 5) received by the moving member 64 from the first engagement teeth 34 and the second engagement teeth 40 is also at its greatest. Since the moving member 64 is restricted from moving toward the axial direction base end side by the first restriction portion 68, that is located at further toward the axial direction base end side from the position of the single-dotted dashed line D, the moving member 64 can be effectively restricted from moving toward the axial direction base end side.

Furthermore, the moving member 64 is capable of expanding in a radiating shape in the orthogonal direction with respect to the axial direction of the moving member 64 at the first deformation-permitting portion 66 at the vehicle lower side of the first restriction portion 68 of the cylinder 58. The expanded portion of the moving member 64 thereby abuts the entire axial center direction leading end of the cylinder 58 at the first restriction portion 68. This enables the moving member 64 to be effectively restricted from moving toward the axial direction base end side by the first restriction portion 68 of the cylinder 58.

Moreover, even if the moving member 64 is severed as a result of the pull-out direction (the arrow B direction in FIG. 5) rotation of the rotating member 28 when the amount by which the first engagement teeth 34 and the second engagement teeth 40 of the rotating member 28 bite or dig into the moving member 64 is at its greatest, a portion of the moving member 64 on the axial direction base end side of the severed location abuts the first restriction portion 68 of the cylinder 58, thereby enabling the moving member 64 to be restricted from moving toward the axial direction base end side.

Furthermore, in the present exemplary embodiment, the vehicle lower side face of the direction-guiding portion 70 of the side wall 72 configures the second restriction portion 76, and the space at the vehicle lower side of the second restriction portion 76 configures the second deformation-permitting portion 74. Note that the vehicle lower side end portion of the direction-guiding portion 70 is disposed on the single-dotted dashed line D, that is extended from the rotation center of the rotating member 28 toward the vehicle width direction inner side and that is orthogonal to the axial center direction of the leading end portion of the cylinder 58. The amount by which the first engagement teeth 34 and the second engagement teeth 40 bite or dig into the moving member 64 (namely, the range over which the first engagement teeth 34 and the second engagement teeth 40 of the rotating member 28 engage with the moving member 64) is at its greatest on the single-dotted dashed line D.

Thus, in the state in which the first engagement teeth 34 and the second engagement teeth 40 are biting or digging into the moving member 64, the deformation amount of the moving member 64 when rotation force in the pull-out direction (the arrow B direction in FIG. 5, etc.) acts on the rotating member 28 is greatest in the vicinity of the single-dotted dashed line D. This enables the moving member 64 to be made to undergo sufficient deformation in the second deformation-permitting portion 74 of the cover plate 50, and enables the moving member 64 to be abutted the second restriction portion 76 of the cover plate 50 such that the moving member 64 is effectively restricted from moving toward the axial direction base end side.

Moreover, the second restriction portion 76 is provided at the vehicle lower side face of the direction-guiding portion 70 of the cover plate 50, and the second restriction portion 76 is formed by profiling the side wall 72 at the inner side of the cover plate 50 toward the vehicle width direction outer side. Thus, the second restriction portion 76 (namely, the direction-guiding portion 70) has a greater cross-section coefficient than other portions of the side wall 72 of the cover plate 50. Thus, the mechanical strength of the side wall 72 is greater at the second restriction portion 76 (namely, the direction-guiding portion 70) than at other portions, and the moving member 64 can be effectively restricted from moving toward the axial direction base end side by the expanded portion of the moving member 64 abutting the second restriction portion 76.

In the present exemplary embodiment, the first deformation-permitting portion 66, the second deformation-permitting portion 74, and the second restriction portion 76 are all configured by the cover plate 50. This enables an increase in the number of components to be suppressed, even when the first deformation-permitting portion 66, the second deformation-permitting portion 74, and the second restriction portion 76 are provided. In the present exemplary embodiment, the first restriction portion 68 is configured by the axial center direction leading end of the cylinder 58. Thus, there is no increase in the number of components, even when the first restriction portion 68 is provided.

Second Exemplary Embodiment

Figure 8:
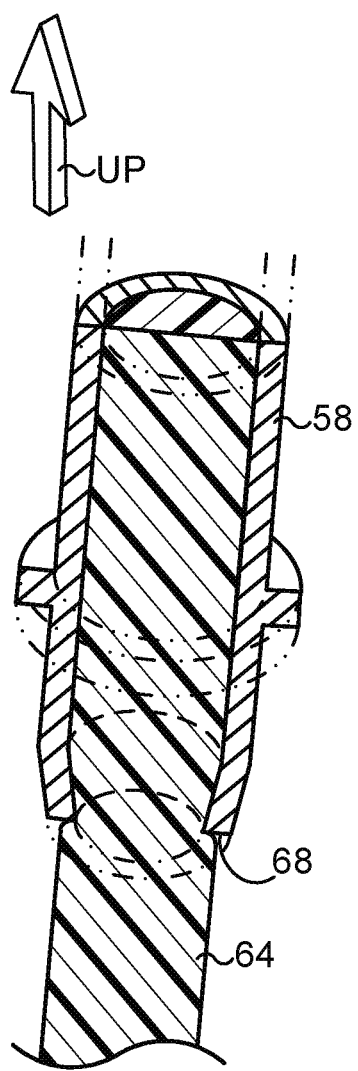
FIG. 8 is a perspective view illustrating an axial direction leading end portion of a cylinder and a moving member in a webbing take-up device according to a second exemplary embodiment.

As illustrated in FIG. 8, in a second exemplary embodiment, internal diameter dimensions and external diameter dimensions of an axial direction leading end portion of a cylinder 58, serving as a tube-shaped member, decrease on progression toward the axial direction leading end side. Thus, the moving member 64 moving toward the axial direction leading end side is deformed so as to be compressed toward the orthogonal direction inner side with respect to the axial direction of the cylinder 58 when passing through the axial direction leading end portion of the cylinder 58.

When the moving member 64 that has been deformed in this manner moves to the vehicle lower side of the axial direction leading end of the cylinder 58, the moving member 64 undergoes recovery deformation so as to expand toward the orthogonal direction outer side. The moving member 64 that has undergone recovery deformation in this manner is pressed by the first engagement teeth 34 and the second engagement teeth 40 of the rotating member 28 attempting to rotate in the pull-out direction (the arrow B direction in FIG. 6, etc.), and the moving member 64 expands further in the orthogonal direction with respect to the axial direction, such that the range over which the moving member 64 and the first restriction portion 68 oppose each other increases. This enables the moving member 64 to be made to abut the first restriction portion 68 effectively when attempting to move toward the axial direction base end side, enabling movement of the moving member 64 toward the axial direction base end side to be effectively restricted.

Third and Fourth Exemplary Embodiments

Figure 9:
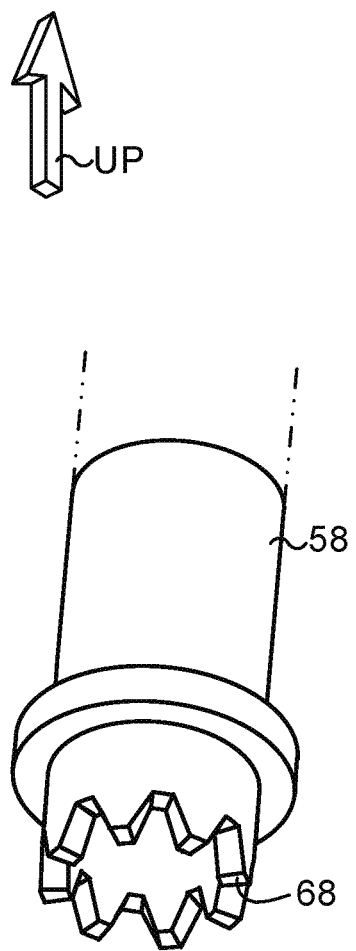
FIG. 9 is a perspective view illustrating an axial direction leading end portion of a cylinder in a webbing take-up device according to a third exemplary embodiment.
Figure 10:
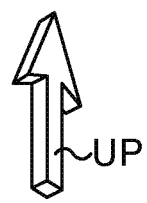
FIG. 10 is a perspective view illustrating an axial direction leading end portion of a cylinder in a webbing take-up device according to a fourth exemplary embodiment.
Figure 10:
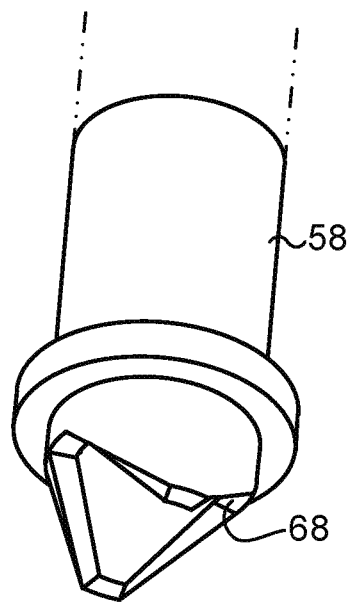

As illustrated in FIG. 9, in a third exemplary embodiment, a first restriction portion 68, this being an axial center direction leading end portion of a cylinder 58 serving as a tube-shaped member, is indented toward the axial direction base end side of the cylinder 58 at predetermined spacings around the circumferential direction of the cylinder 58. As illustrated in FIG. 10, in a fourth exemplary embodiment, a first restriction portion 68, serving as a restriction portion at an axial direction leading end portion of a cylinder 58, is indented toward the axial center direction base end side of the cylinder 58 at two locations at opposing sides of the center of the cylinder 58.

Due to the axial center direction leading end of the cylinder 58 being locally indented at the circumferential direction toward the axial center direction base end side, the surface area of the first restriction portion 68 at the axial center direction leading end of the cylinder 58 increases. Thus, when a portion of a moving member 64 (not illustrated in FIG. 9 and FIG. 10) that has deformed in the orthogonal direction with respect to the axis direction of the cylinder 58 abuts the first restriction portions 68 of the cylinder 58, the moving member 64 can be effectively restricted from moving toward the axial direction base end side.

Fifth Exemplary Embodiment

Figure 11:
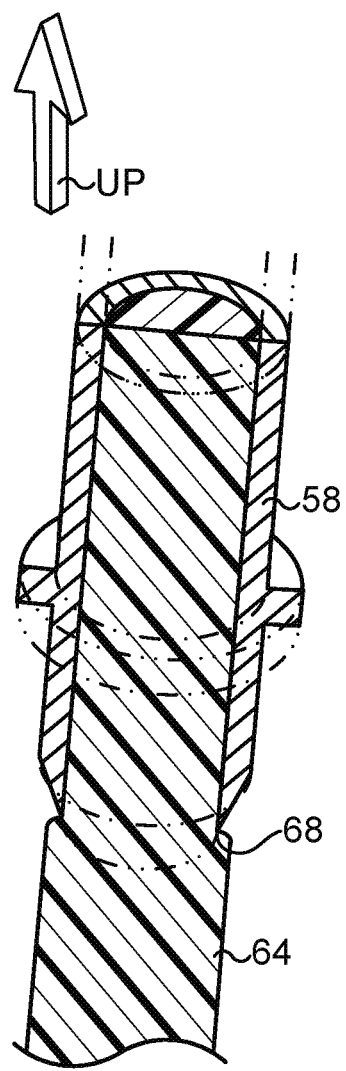
FIG. 11 is a perspective view illustrating an axial direction leading end portion of a cylinder and a moving member in a webbing take-up device according to a fifth exemplary embodiment.

As illustrated in FIG. 11, in a fifth exemplary embodiment, external diameter dimensions of an axial direction leading end portion of a cylinder 58, serving as a tube-shaped member, decrease on progression toward the axial direction leading end side. A first restriction portion 68, serving as a restriction portion at the axial direction leading end of the cylinder 58, has a thinner dimension in the orthogonal direction with respect to the axial direction of the cylinder 58 than the thickness of the cylinder 58, and the thickness of the first restriction portion 68 is preferably set so as to form a very thin blade shape. Thus, when a portion of a moving member 64 that has expanded toward the orthogonal direction outside abuts the first restriction portion 68 of the cylinder 58, the first restriction portion 68 bites or digs into the expanded portion of the moving member 64. The moving member 64 is thereby effectively restricted from moving toward the axial direction base end side.

Sixth Exemplary Embodiment

Figure 12:
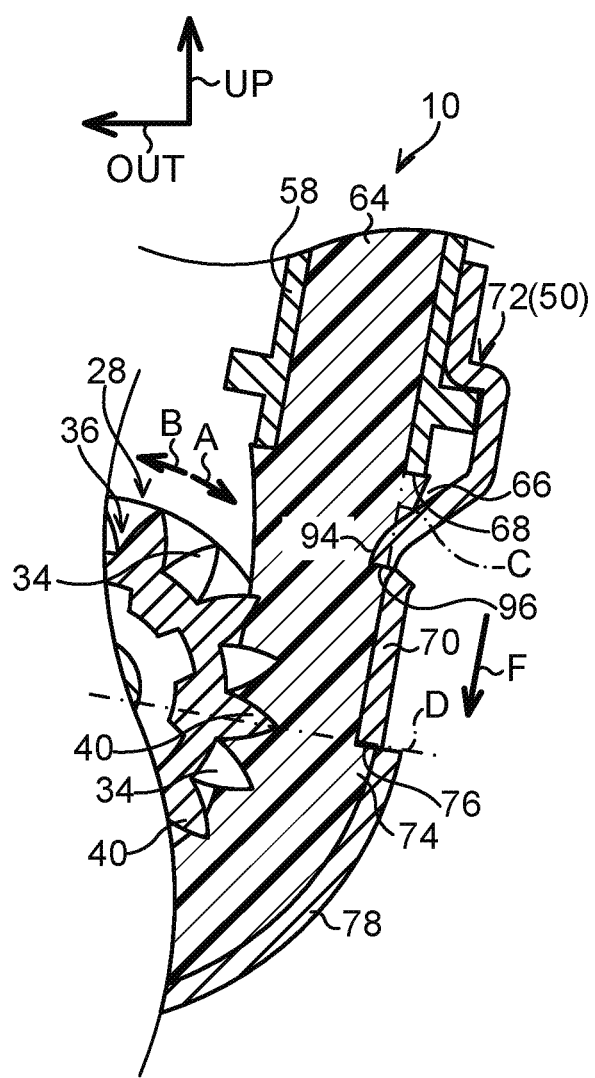
FIG. 12 is a cross-section illustrating an axial direction leading end portion of a cylinder and the vicinity thereof in a webbing take-up device according to a sixth exemplary embodiment.

As illustrated in FIG. 12, in a sixth exemplary embodiment, a deforming portion 94 is formed at a side wall 72, serving as a wall section, of a cover plate 50, serving as a guide section. The deforming portion 94 is provided between an axial direction leading end of a cylinder 58 configuring a first restriction portion 68, serving as a restriction portion, and a second restriction portion 76, serving as a restriction portion and provided at the side wall 72 of the cover plate 50. Part of the side wall 72 of the cover plate 50 is profiled toward the vehicle width direction outer side at the deforming portion 94.

A vehicle lower side end portion of the deforming portion 94 is disposed on a movement trajectory of the moving member 64 between the first restriction portion 68 and the second restriction portion 76 when the moving member 64 moves toward the axial direction leading end side. Thus, when the moving member 64 moves toward the axial direction leading end side between the first restriction portion 68 and the second restriction portion 76, the moving member 64 abuts the vehicle lower side end portion of the deformed portion of the side wall 72 of the cover plate 50, and is deformed so as to become indented toward the vehicle width direction outer side.

Furthermore, a third restriction portion 96, serving as a restriction portion, is configured at a vehicle lower side end of the deforming portion 94. The third restriction portion 96 is disposed at the vehicle upper side of the single-dotted dashed line D extending from the rotation center of the rotating member 28 toward the vehicle width direction inner side in a direction orthogonal to the axial center direction of the leading end portion of the cylinder 58.

Namely, in the present exemplary embodiment, the third restriction portion 96 is disposed at the vehicle upper side of the rotation position of the first engagement teeth 34 and the second engagement teeth 40 where the amount by which the first engagement teeth 34 and the second engagement teeth 40 of the rotating member 28 bite or dig into the moving member 64, namely, the range over which the first engagement teeth 34 and the second engagement teeth 40 of the rotating member 28 engage with the moving member 64, is at its greatest, and the third restriction portion 96 is also disposed further toward the vehicle lower side than the first restriction portion 68.

The third restriction portion 96 is configured by a planar face orthogonal to the axial center direction of the leading end portion of the cylinder 58. When the moving member 64 that has been deformed by the deforming portion 94 of the side wall 72 undergoes recovery deformation at the vehicle lower side of the deforming portion 94, a portion of the moving member 64 at the vehicle lower side of the deforming portion 94 opposes the third restriction portion 96 in the axial center direction of the cylinder 58.

Thus, when the moving member 64 attempts to move toward the axial direction base end side, the moving member 64 abuts the third restriction portion 96 between the first restriction portion 68 and the second restriction portion 76, thereby enabling the moving member 64 to be more restricted from moving toward the axial direction base end side even more effectively.

Seventh Exemplary Embodiment

Figure 13:
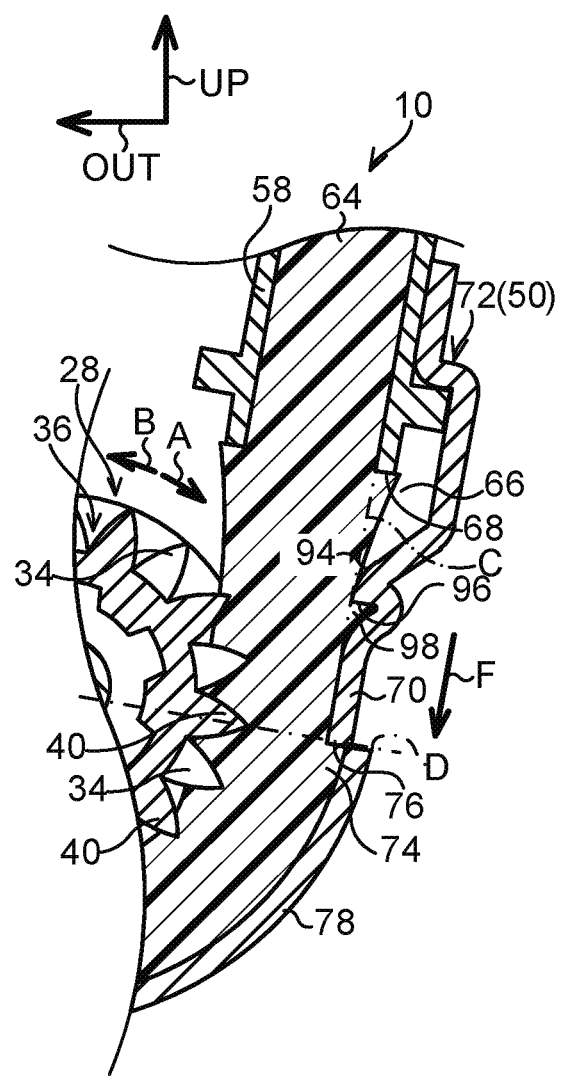
FIG. 13 is a cross-section illustrating an axial direction leading end portion of a cylinder and the vicinity thereof in a webbing take-up device according to a seventh exemplary embodiment.

As illustrated in FIG. 13, in a seventh exemplary embodiment, a third restriction portion 96 is disposed at the vehicle upper side of a position of the first engagement teeth 34 and the second engagement teeth 40 where the amount by which the first engagement teeth 34 and the second engagement teeth 40 of the rotating member 28 bite or dig into the moving member 64 is at its greatest. Moreover, the third restriction portion 96 is disposed at the vehicle lower side of the first restriction portion 68.

Moreover, the third restriction portion 96 configures a vehicle lower side end portion of a deforming portion 94 formed at the side wall 72 of the cover plate 50. The third restriction portion 96 is disposed between an axial direction leading end of a cylinder 58, serving as a tube-shaped member configuring a first restriction portion 68, and the second restriction portion 76 at the outer side of a movement trajectory of the moving member 64 toward the axial direction leading end side.

A third deformation-permitting portion 98 is configured inside the cover plate 50 at a vehicle lower side portion of the third restriction portion 96. The moving member 64 that has been compressed in the axial direction is able to deform in the orthogonal direction with respect to the axial direction of the moving member 64 so as to occupy the space in the third deformation-permitting portion 98.

In the present exemplary embodiment, the moving member 64 that has been compressed as a result of being pressed by the first engagement teeth 34 and the second engagement teeth 40 of the rotating member 28 attempting to rotate in the pull-out direction (the arrow B direction in FIG. 14) is able to deform in the orthogonal direction with respect to the axial direction of the moving member 64 so as to occupy the space in the third deformation-permitting portion 98. Thus, the portion of the moving member 64 that has expanded into the third deformation-permitting portion 98 opposes the third restriction portion 96 in the axial center direction of the leading end portion of the cylinder 58. Thus, when the moving member 64 attempts to move toward the axial direction base end side, the expanded portion of the moving member 64 inside the third deformation-permitting portion 98 abuts the third restriction portion 96. This enables the moving member 64 to be restricted from moving toward the axial direction base end side even more effectively.

In the present exemplary embodiment, the deforming portion 94 is provided outside the movement trajectory of the moving member 64, thereby enabling the moving member 64 to be suppressed from being subject to resistance from the deforming portion 94 as the moving member 64 moves toward the axial direction leading end side. This enables the moving member 64 to move smoothly toward the axial direction leading end side.

Eighth Exemplary Embodiment

Figure 14:
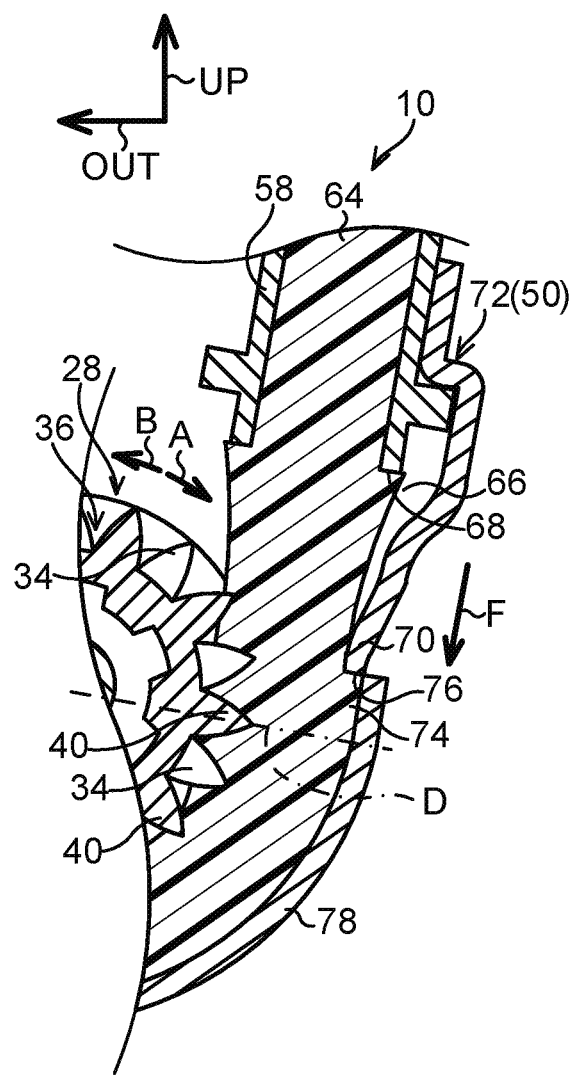
FIG. 14 is a cross-section illustrating an axial direction leading end portion of a cylinder and the vicinity thereof in a webbing take-up device according to an eighth exemplary embodiment.

As illustrated in FIG. 14, in an eighth exemplary embodiment, a second restriction portion 76, serving as a restriction portion formed at the side wall 72 of the cover plate 50, is disposed at the vehicle upper side of the single-dotted dashed line D, that is extended from the rotation center of the rotating member 28 toward the vehicle width direction inner side in a direction orthogonal to the axial center direction of the leading end portion of the cylinder 58.

Namely, in the present exemplary embodiment, the second restriction portion 76 is disposed at the vehicle upper side of a rotation position of the first engagement teeth 34 and the second engagement teeth 40 where the amount by which the first engagement teeth 34 and the second engagement teeth 40 bite or dig into the moving member 64 is at its greatest. Moreover, the second restriction portion 76 is disposed at the vehicle lower side of the first restriction portion 68, serving as a restriction portion at the axial center direction leading end of the cylinder 58. Such a configuration enables similar advantageous effects to those of the first exemplary embodiment to be obtained.

Note that each of the above exemplary embodiments is configured including the first deformation-permitting portion 66 and the first restriction portion 68, and the second deformation-permitting portion 74 and the second restriction portion 76. However, a configuration including only the first deformation-permitting portion 66 and the first restriction portion 68, or a configuration including only the second deformation-permitting portion 74 and the second restriction portion 76, may be applied.

Moreover, each of the above exemplary embodiments is configured such that the first restriction portion 68, serving as a restriction portion, is configured at the axial center direction leading end of the cylinder 58, serving as a tube-shaped member (at one end face of the tube-shaped member) and the second restriction portion 76, serving as a restriction portion, is provided to the cover plate 50, serving as a guide section. However, for example, a restriction portion may be provided separately to the tube-shaped member or the guide section, for example being provided to the leg plate 16 of the frame 12 or the like.

Moreover, each of the above exemplary embodiments is configured such that the first deformation-permitting portion 66 and the second deformation-permitting portion 74, serving as deformation-permitting portions, are provided to the cover plate 50, serving as a guide section. However, for example, a configuration may be applied in which the axial center direction leading end of the cylinder 58 is disposed outside the cover plate 50, and the moving member 64 is capable of expanding in an orthogonal direction with respect the axial direction of the cylinder 58 between the axial center direction leading end of the cylinder 58 and the cover plate 50. The moving member 64 is thereby restricted from moving toward the axial direction base end side due to the portion of the moving member 64 that has expanded in the orthogonal direction between the axial center direction leading end of the cylinder 58 and the cover plate 50 abutting the axial center direction leading end of the cylinder 58.

In some of the above exemplary embodiments, the second restriction portion 76, serving as a restriction portion, and the second deformation-permitting portion 74, serving as a deformation-permitting portion, are set close to the position where the amount by which the first engagement teeth 34 and the second engagement teeth 40 of the rotating member 28 bite or dig into the moving member 64 is at its greatest. However, the position of a restriction portion and the position of a deformation-permitting portion may be set at locations other than locations close to the position where the amount by which the first engagement teeth 34 and the second engagement teeth 40 of the rotating member 28 bite or dig into the moving member 64 is at its greatest.

The disclosure of Japanese Patent Application No. 2016-115674 is incorporated in its entirety by reference herein.

All cited documents, patent applications, and technical standards mentioned in the present specification are incorporated by reference in the present specification to the same extent as if each cited document, patent application, or technical standard was specifically and individually indicated to be incorporated by reference.

The invention claimed is:

1. A webbing take-up device comprising:
   a spool that takes up a webbing of a seatbelt device by being rotated in a take-up direction, and that is applied with rotation force in a pull-out direction opposite to the take-up direction when the webbing is pulled;
   a rotating member that, when rotated toward one side, rotates the spool in the take-up direction, and that is rotated toward another side by rotation of the spool in the pull-out direction;
   a moving member that is moved toward an axial direction leading end side in a vehicle emergency so as to engage with the rotating member, that rotates the rotating member toward the one side, and that is capable of deforming in a direction intersecting the axial direction;
   a tube-shaped member that is disposed with the moving member inside the tube-shaped member, and one end of the tube-shaped member being open at a side of the rotating member; and
   a first restriction portion that engages with a deformed portion of the moving member so as to restrict movement of the moving member toward an axial direction base end side, wherein:
   the deformed portion of the moving member is configured to be moved outward from the one end of the tube-shaped member and has a wider diameter than an internal diameter of the tube-shaped member, and
   the first restriction portion is configured as a face of the one end of the tube-shaped member.

2. The webbing take-up device of claim 1, wherein:
   under pressure of a fluid supplied to another end side of the tube shaped member, the moving member is moved toward the axial direction leading end side and is moved outward from the one end of the tube-shaped member so as to engage with the rotating member;
   the rotating member includes an engagement portion that engages with the moving member, the engagement portion has an engagement range with the moving member, and the engagement range increases and decreases due to rotation of the rotating member accompanying movement of the moving member toward the axial direction leading end side; and
   the first restriction portion is provided between a rotation position of the engagement portion where the engagement range between the engagement portion of the rotating member and the moving member is at its greatest, and the one end of the tube-shaped member.

3. The webbing take-up device of claim 2, further comprising:
   a guide section guiding the moving member that has moved in a vehicle emergency, wherein the guide section is provided with a deformation-permitting portion, which is configured to permit deformation of the moving member and is disposed further toward the axial direction leading end side at the guide section than the first restriction portion.

4. The webbing take-up device of claim 3, wherein a second restriction portion is provided at the guide section.

5. The webbing take-up device of claim 3, wherein the moving member is capable of deforming toward a radial direction outer side of the tube-shaped member at an outer side of the face of the one end of the tube-shaped member.

6. The webbing take-up device of claim 1, further comprising:
   a guide section guiding the moving member that has moved in a vehicle emergency, wherein the guide section is provided with a deformation-permitting portion, which is configured to permit deformation of the moving member and is disposed further toward the axial direction leading end side at the guide section than the first restriction portion.

7. The webbing take-up device of claim 6, wherein a second restriction portion is provided at the guide section.

8. The webbing take-up device of claim 6, wherein the deformation-permitting portion is disposed next to the first restriction portion.

9. The webbing take-up device of claim 1, wherein the moving member is capable of deforming toward a radial direction outer side of the tube-shaped member at an outer side of the face of the one end of the tube-shaped member.

* * * * *